(12) United States Patent
Kawashima et al.

(10) Patent No.: US 9,178,993 B2
(45) Date of Patent: Nov. 3, 2015

(54) LINE CONNECTION APPARATUS AND METHOD

(71) Applicant: FUJITSU LIMITED, Kawasaki (JP)

(72) Inventors: Naoto Kawashima, Yokohama (JP); Naoto Matsudaira, Yokohama (JP); Yuusuke Tounai, Nishi (JP); Hiroshi Yoshida, Yokohama (JP); Shingo Hirono, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/025,167

(22) Filed: Sep. 12, 2013

(65) Prior Publication Data

US 2014/0016771 A1    Jan. 16, 2014

Related U.S. Application Data

(63) Continuation of application No. PCT/JP2011/056461, filed on Mar. 17, 2011.

(51) Int. Cl.
*H04M 3/523* (2006.01)
*H04M 3/428* (2006.01)

(52) U.S. Cl.
CPC ............ *H04M 3/428* (2013.01); *H04M 3/5231* (2013.01)

(58) Field of Classification Search
CPC ............................ H04M 3/42195; H04M 3/48
USPC ............ 379/215.01, 209.01, 265.01; 370/259
See application file for complete search history.

(56) References Cited

U.S. PATENT DOCUMENTS

| 5,537,470 A * | 7/1996 | Lee ........................... 379/265.11 |
| 6,473,437 B2 * | 10/2002 | Stumer .......................... 370/462 |
| 2005/0047576 A1 | 3/2005 | Hidesawa et al. |

(Continued)

FOREIGN PATENT DOCUMENTS

| JP | 04-223543 | 8/1992 |
| JP | 5-83386 | 4/1993 |

(Continued)

OTHER PUBLICATIONS

Patent Abstracts of Japan, Publication No. 2005-072936, Published Mar. 17, 2005.

(Continued)

*Primary Examiner* — Fan Tsang
*Assistant Examiner* — Jeffrey Lytle
(74) *Attorney, Agent, or Firm* — Staas & Halsey LLP

(57) ABSTRACT

A line connection apparatus is disclosed. A hold/release recognition part records first person identification information by corresponding to second person identification information in a connection database stored in a storage part when a hold is recognized. The first person identification information identifies a first person who holds a line. The second person identification information identifies a second person for whom the line is held. The connection database maintains a state of holding a line and releasing a hold of the line. The connection control part refers to the connection control database and has a first person terminal of the first person in a hold state based on the first person identification information, which is corresponded to the second person identification information indicated by a re-connection request, in response to the re-connection request conducted by a same second person after the line is disconnected in the hold state.

11 Claims, 17 Drawing Sheets

(56) References Cited

U.S. PATENT DOCUMENTS

| | | | |
|---|---|---|---|
| 2005/0147227 A1* | 7/2005 | Chervirala et al. | 379/215.01 |
| 2012/0099721 A1* | 4/2012 | Peterson et al. | 379/266.01 |
| 2012/0155629 A1* | 6/2012 | Morken et al. | 379/229 |
| 2014/0016771 A1 | 1/2014 | Kawashima et al. | |

FOREIGN PATENT DOCUMENTS

| | | |
|---|---|---|
| JP | 5-206937 | 8/1993 |
| JP | 6-37895 | 2/1994 |
| JP | 6-232975 | 8/1994 |
| JP | 9-200340 | 7/1997 |
| JP | 2000-83098 | 3/2000 |
| JP | 2004-227228 | 8/2004 |
| JP | 2005-72936 | 3/2005 |
| JP | 2008-219826 | 9/2008 |
| JP | 2009-218815 | 9/2009 |

OTHER PUBLICATIONS

Patent Abstracts of Japan, Publication No. 2000-083098, Published Mar. 21, 2000.
Patent Abstracts of Japan, Publication No. 06-037895, Published Feb. 10, 1994.
Patent Abstracts of Japan, Publication No. 09-200340, Published Jul. 31, 1997.
Patent Abstracts of Japan, Publication No. 2008-219826, Published Sep. 18, 2008.
Patent Abstracts of Japan, Publication No. 05-206937, Published Aug. 13, 1993.
Patent Abstracts of Japan, Publication No. 06-232975, Published Aug. 19, 1994.
Patent Abstracts of Japan, Publication No. 2009-218815, Published Sep. 24, 2009.
Patent Abstracts of Japan, Publication No. 2004-227228, Published Aug. 12, 2004.
Patent Abstracts of Japan, Publication No. 05-083386, Published Apr. 2, 1993.
International Search Report of PCT/JP2011/056461 mailed Jun. 28, 2011.
Chinese Office Action issued Dec. 9, 2014 in corresponding Chinese Patent Application No. 201180069328.3.
Patent Abstracts of Japan, Publication No. 04-223543, published Aug. 13, 1992.
U.S. Office Action mailed on Jun. 1, 2015 in U.S. Appl. No. 14/021,411.
U.S. Appl. No. 14/021,411, filed Sep. 9, 2013, Kawashima et al., Fujitsu Limited.

* cited by examiner

FIG.7A

31 OPERATOR DB

| OPERATOR ID | CONNECTION STATE |
|---|---|
| OP11111 | LOCKED |
| OP22222 | AVAILABLE |
| OP33333 | BUSY |
| OP44444 | HOLD |
| ... | ... |

FIG.7B

32 CONNECTION CONTROL DB

33

| LOCK TIME STANDARD VALUE | 3 MIN |
|---|---|

| OPERATOR ID | CUSTOMER TELEPHONE NUMBER | LOCK TIME |
|---|---|---|
| OP44444 | 090-1111-2222 | – |
| OP11111 | 090-3333-4444 | 2010/09/30 10:20:55 TO 10:23:55 |
| ... | ... | ... |

WE ARE CURRENTLY SEARCHING.

PLEASE WAIT.

LINE CONNECTION APPARATUS AND METHOD

CROSS-REFERENCE TO RELATED APPLICATION

This application is a continuation of International Application PCT/JP2011/056461 filed on Mar. 17, 2011 and designated in the U.S., the entire contents of which are incorporated herein by reference.

FIELD

The present invention is related to a re-connection of a telephone line which is disconnected after being held.

BACKGROUND

Conventionally, in a case of a telephone call, the telephone call is received in response to a connection request from a caller. For a case in which a line is set to a hold state in order to respond to an inquiry, a request, and the like from a caller, there are various approaches to release the hold state by a held side.

A technology is presented in that a special number is dialed at a held side to send a hold release request signal or the like, and a speaker of a telephone at a holding side is turned on to communicate with a person with voice at the holding side. A technology is presented in that a message recorded by the held side is corresponded to a telephone number of the holding side. A technology is presented to recover a communication state by releasing the hold state when a re-connection is available within a predetermined time after a call is set to the hold state in response to the communication state or a remaining battery level of a wireless communication terminal. A technology is also presented to record a telephone number of the held side when a connection is disconnected at the held side during the hold state and to re-connect from the hold side.

PATENT DOCUMENTS

Patent Document 1: Japanese Laid-open Patent Publication No. 2000-83098
Patent Document 2: Japanese Laid-open Patent Publication No. H06-37895
Patent Document 3: Japanese Laid-open Patent Publication No. H09-200340
Patent Document 4: Japanese Laid-open Patent Publication No. 2008-219826
Patent Document 5: Japanese Laid-open Patent Publication No. H05-206937
Patent Document 6: Japanese Laid-open Patent Publication No. H06-232975

SUMMARY

According to one aspect of an embodiment, there is provided a line connection apparatus, including a processor; and a storage part; wherein the processor includes: a hold/release recognition part configured to record first person identification information by corresponding to second person identification information in a connection database stored in the storage part when a hold is recognized, the first person identification information identifying a first person who holds a line, the second person identification information identifying a second person for whom the line is held, the connection database for managing holding a line and releasing a hold of the line; and a connection control part configured to refer to the connection control database stored in the storage part and to have a first person terminal of the first person receive the re-connection request in a hold state based on the first person identification information, which is corresponded to the second person identification information indicated by a re-connection request, in response to the re-connection request conducted by a same second person after the line is disconnected in the hold state.

According to other aspects of the embodiment, there may be provided a line connection method, and a non-transitory computer-readable recording medium to cause a computer to function as the above described apparatus.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIG. 7A is a diagram illustrating a data configuration example of an operator DB,
and FIG. 7B is a diagram illustrating a data configuration example of a connection control DB.

DESCRIPTION OF EMBODIMENT

By using related arts, it becomes possible to resume a telephone communication from a held side in a middle of a hold state set at a holding side. However, even if a telephone communication is resumed in the middle of the hold state, a person at the holding side (hereinafter, called "holding person") and a person at the held side (hereinafter, called "held person") conduct various operations to re-connect a line after a disconnection of the line, and it will be a situation before and after the disconnection.

For an operator service such as a call center to correspond to an inquiry, a request, and the like of a customer, a telephone, which is recently and widely used, is generally used to respond to the inquiry or the like. In the operator service, an operator may hold a call to respond to the inquiry. In a hold state, the line may be temporarily disconnected by a telephone of the customer at a held side due to a use circumstance of the telephone of the customer or may be intentionally disconnected by the customer. There is a case in which the customer attempts to connect again a few minutes later. In this case, a line connection apparatus may refer to a customer correspondence history, and may have the operator, who holds a previous connection, re-connect the line for the customer.

However, the operator holding the previous connection has been working to answer the inquiry. The operator may not be aware of the disconnection made by the customer, and may concentrate on his/her work or may not be at his/her desk for a search. Hence, when a customer is re-connected through the utterance of their voice, the operator temporarily stops work and a search in process, purposely conducts an operation to respond to an incoming call, and initiates a conversational interaction with the customer. The work being conducted by the operator is interrupted to respond to the customer due to the re-connection. Thus, since the operator may not concentrate on his/her work, the response to the customer may not be effectively performed by the operator.

Figure 1:
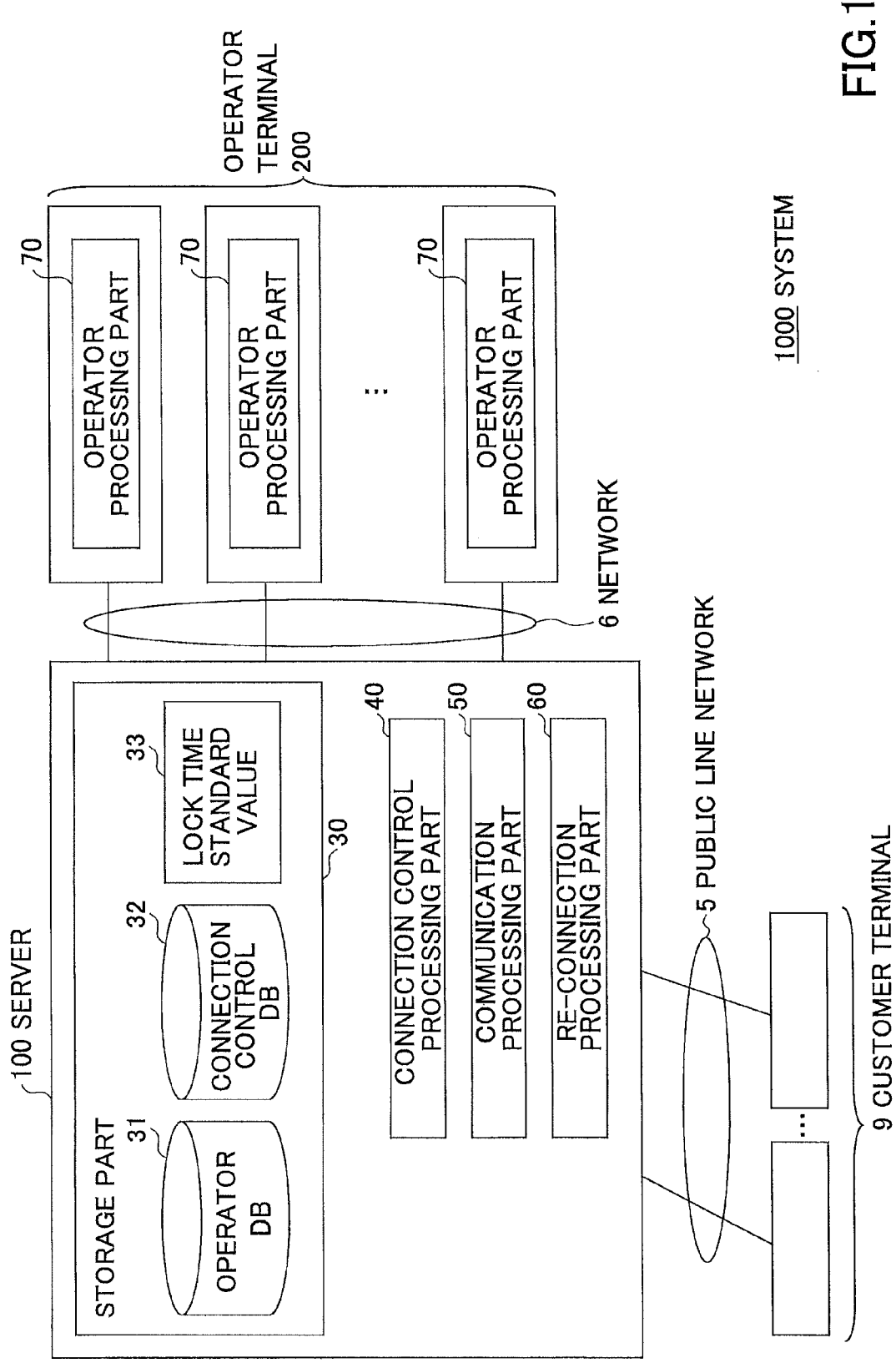
FIG. 1 is a diagram illustrating a system configuration example according to an embodiment.

In the following, an embodiment of the present invention will be described with reference to the accompanying drawings. FIG. 1 is a diagram illustrating a system configuration example according to the embodiment. A system 1000 illustrated in FIG. 1 includes a server 100, multiple customer terminals 9, and multiple operator terminals 200. The server 100 is connected to the multiple customer terminals 9 through a public line network 5. Also, the server 100 is connected to the multiple operator terminals 200 through a network 6.

The server 100 corresponds to a line connection apparatus placed at the call center concerning a service, and conducts a connection process and a disconnection process pertinent to a communication between a customer terminal 9 of a customer who inquires and an operator terminal 200 of an operator who corresponds to the inquiry of the customer. The server 100 includes a connection control processing part 40, a communication processing part 50, and a re-connection processing part 60. The server 100 determines whether a connection request of the customer terminal 9 from the public line network 5 is made due to the re-connection or is a regular connection, and intermediates a communication with the operator terminal 200. Also, the server 100 stores an operator database (DB) 31, a connection control DB 32, and a lock time standard value 33 in a storage part 30. Each of the parts 40, 50, and 60, the databases 31 and 32, and the lock time standard value 33 will be described later.

In the embodiment, the re-connection is performed to accept the connection request from the customer terminal 9 after the customer terminal 9 disconnects a previous line connection which was made and has been in the hold state within a predetermined time. In the re-connection in the embodiment, in response to a hold response instruction from the server 100, the same operator terminal 200 automatically receives a call of the reconnection, instead of an operation for responding to the hold response instruction and receiving the call (a responding and receiving operation) by the operator.

On the other hand, in the regular connection, a first connection request is received in which the connection request has not received from the same customer terminal 9 within the predetermined time. The first connection request is established by the operator operating to accept and respond the first connection request (an accepting and responding operation).

Each of the multiple operator terminals 200 is regarded as a terminal used by the operator, who handles the inquiry of the customer, such as a cellular phone or a mobile communication terminal including a phone function. Each of the multiple operator terminals 200 includes an operator processing part 70 for communicating with the customer terminal 9 and conversationally interacting with the customer through the server 100.

Figure 2:
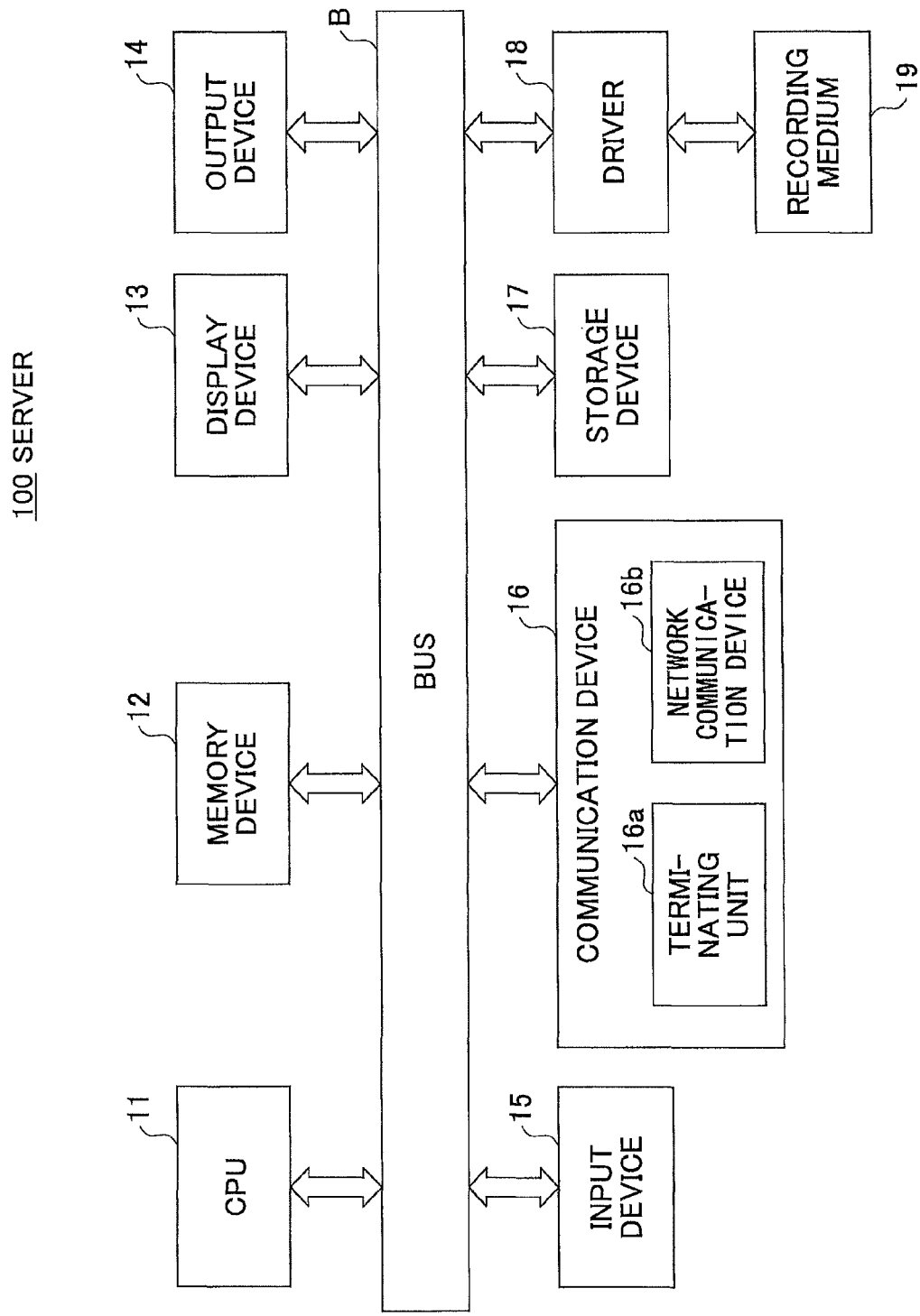
FIG. 2 is a diagram illustrating a hardware configuration of a server.

The server 100 according to the embodiment includes a hardware configuration as depicted in FIG. 2. FIG. 2 is a diagram illustrating the hardware configuration of the server 100.

In FIG. 2, the server 100 is regarded as an apparatus which is controlled by a computer, and includes a processor such as a Central Processing Unit (CPU) 11, a memory device 12, a display device 13, an output device 14, an input device 15, a communication device 16, a storage device 17, and a driver 18, which are mutually connected through a bus B.

The CPU 11 controls the server 100 in accordance with a program stored in the memory device 12. The memory device 12 includes a Random Access Memory (RAM), a Read-Only Memory (ROM), or the like. The memory device 12 stores the program to be executed by the CPU 11, data for a process conducted by the CPU 11, data acquired in the process, and the like. Also, a part of an area of the memory device 12 is allocated as a working area which is used in the process conducted by the CPU 11.

The display device 13 displays various information items for a control by the CPU 11. The output device 14 includes a printer, and the like, and is used to output various information items in response to an instruction from an administrator. The input device 15 includes a mouse, a keyboard, and the like, and is used for the administrator to input the various information items for the process conducted by the server 100.

The communication device 16 includes a terminating unit 16a and a network communication device 16b. The terminating unit 16a is regarded as a device which converts an analogue voice received from the customer terminal 9 into a digital signal. The network communication device 16b may connect to a Local Area Network (LAN) such as Ethernet or the like, and perform communication with the operator terminal 100. The communication device 16 controls the communication between the customer terminal 9 and the operator terminal 200 under the control by the CPU 11.

The storage device 17 includes a hard disk unit, and stores data such as programs for conducting various processes and the like. The memory device 12 and/or the storage device 17 may correspond to a storage part 30 depicted in FIG. 1.

The program realizing the process which is conducted by the server 100 may be provided to the server 100 by a recording medium 19 such as a Compact Disc Read-Only Memory (CD-ROM) or the like. The recording medium 19 may be formed by a non-transitory (or tangible) computer-readable recording medium. When the recording medium 19 storing the program is set into the driver 18, the driver 18 reads out the program from the recording medium 19, and the program being read out is installed into the storage device 17 through the bus B. When the CPU 11 is instructed to execute the program, the CPU 11 starts the process in accordance with the program installed into the storage device 17. A recording medium is not limited to the CD-ROM to store the program. The recording medium may be any computer-readable recording medium. The computer-readable recording medium may be a portable recording medium such as a Digital Versatile Disk (DVD) disk, a Universal Serial Bus (USB) memory, or the like, or a semiconductor memory such as a flash memory or the like, as well as the CD-ROM.

Figure 3:
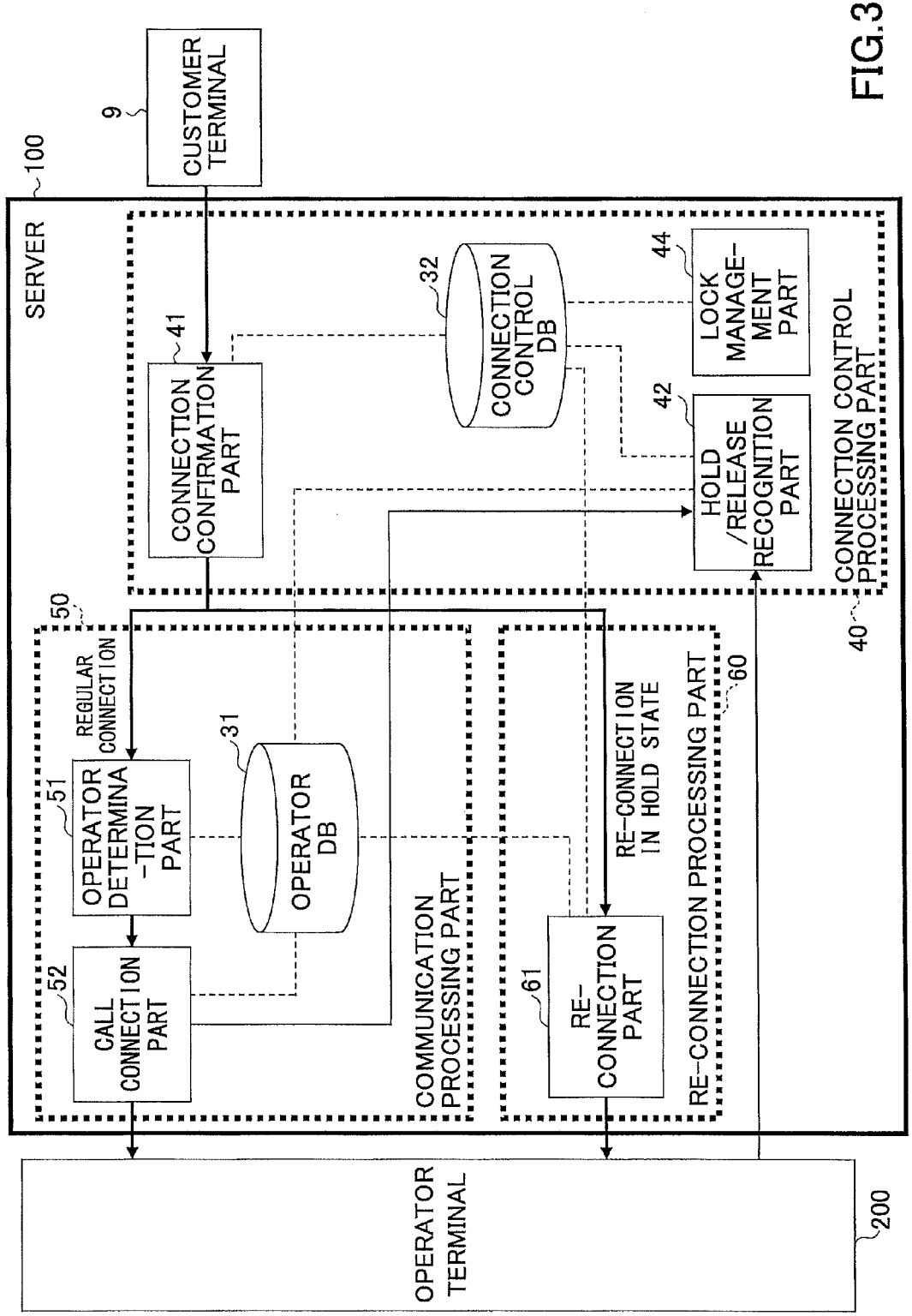
FIG. 3 is a diagram illustrating a functional configuration example of the server.

FIG. 3 is a diagram illustrating a functional configuration example of the server 100. The server 100 depicted in FIG. 3 realizes each of the connection control processing part 40, the communication processing part 50, and the re-connection processing part 60 by the CPU 11 executing corresponding programs.

The connection control processing part 40 is regarded as a control part which controls the communication processing part 50 or the re-connection processing part 60 to conduct processes pertinent to the connection or the disconnection from the customer terminal 9 through the terminating unit 16a by referring to the connection control DB 32.

In a case of the regular connection, the connection control processing part 40 controls the communication processing part 50 to conduct a corresponding process. On the other hand, when a connection is determined as the re-connection from the same customer terminal 9 after the communication in the hold state is disconnected, the connection control processing part 40 controls the re-connection processing part 60 to conduct a re-connection process which retains the hold state.

The connection control processing part 40 includes a connection confirmation part 41, a hold/release recognition part 42, and a lock management part 44.

The connection confirmation part 41 is regarded as a processing part which checks whether the connection request is for the regular connection or the re-connection in the hold state, by referring to the connection control DB 32 stored in the storage part 30.

The hold/release recognition part 42 is regarded as a processing part which recognizes the hold state of the line, a hold release, or the disconnection and updates the operator DB 31 and the connection control DB 32. In response to an operation for holding the line or releasing the hold state by the operator from the operator terminal 200, the hold/release recognition part 42 updates the operator DB 31 and the connection control DB 32. Also, if the disconnection of the line is acknowledged, the hold/release recognition part 42 conducts a disconnection process corresponding to a connection state in which the communication ends or the disconnection is caused while in the hold state.

The lock management part 44 is regarded as a processing part which maintains a passage of a lock time managed by the connection control DB 32. The lock time indicates a time to exclude the connection with another customer terminal 9 for the operator terminal 200 which corresponds to a customer terminal 9 in a case of a line disconnection by the customer terminal 9 in the hold state.

When receiving a disconnection notice from the communication processing part 50, the hold/release recognition part 42 updates the connection control DB 32 in response to a disconnection state in which the operator disconnects or the customer disconnects. In the embodiment, if the customer disconnects after the connection is held, the lock time for locking from a current time is set to the connection control DB 32 based on the lock time standard value 33. By setting the lock time to the connection control DB 32, for a case of the re-connection by the same customer terminal 9, the connection to the operator terminal 200 who holds the communication is controlled not to be initiated in response to the connection request from another customer terminal 9.

The communication processing part 50 is regarded as a processing part which determines the operator terminal 200 available to connect to the customer terminal 9 and initiates the connection process when the connection request sent from the customer terminal 9 is received from the connection confirmation part 41 of the connection control processing part 40. Also, the communication processing part 50 sends a disconnection notice to the hold/release recognition part 42 of the connection control processing part 40 when the communication between the customer terminal 9 and the operator terminal 200 is disconnected in a busy state.

The communication processing part 50 includes an operator determination part 51, and a call connection part 52. The operator determination part 51 is regarded as a processing part which refers to the operator DB 31 stored in the storage part 30 and determines the operator terminal 200 being connectable for which an available state is indicated, when the connection request of the customer terminal 9 is received from the connection confirmation part 41 of the connection control processing part 40.

The call connection part 52 is regarded as a processing part which conducts the connection process for connecting to the operator terminal 200 determined by the operator determination part 51. Also, the call connection part 52 reports the disconnection of the communication to the connection confirmation part 41 of the connection control processing part 40 when the communication between the customer terminal 9 and the operator terminal 200 is disconnected in the busy state.

The re-connection processing part 60 includes a re-connection part 61. The re-connection processing part 60 conducts a re-connection process for the operator terminal 200 which is recognized as holding the connection with the customer terminal 9 which sent the re-connection request, when the re-connection request is received in the hold state from the connection confirmation part 41 of the connection control processing part 40. In this re-connection process, the operator terminal 200 is controlled to automatically receive the re-connection request. Thus, the operator of the operator terminal 200 does not conduct an operation to receive the connection request.

Even to the operator, a call re-connection is not informed to the operator. Accordingly, it is possible for the operator to successively conduct the work in the hold state, instead of consuming time to respond to the customer due to the call re-connection.

Figure 4:
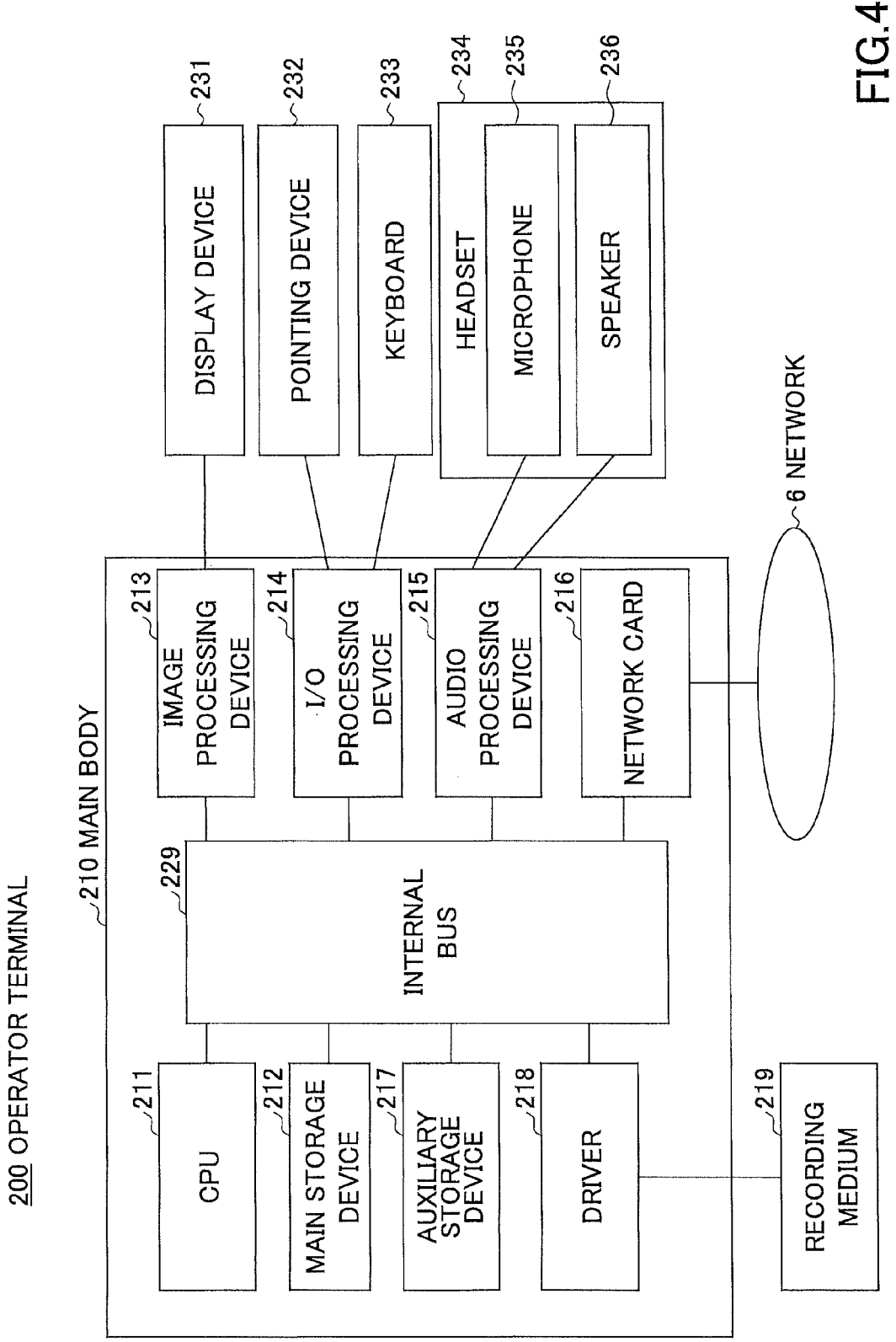
FIG. 4 is a diagram illustrating a hardware configuration of an operator terminal.

The operator terminal 200 includes a hardware configuration as depicted in FIG. 4. FIG. 4 is a diagram illustrating the hardware configuration of the operator terminal 200. In FIG. 4, the operator terminal 200 includes a processor such as a CPU 211, a main storage device 212, an image processing device 213, an input/output (I/O) processing device 214, an audio processing device 215, a network card 216, an auxiliary storage device 217, and a driver 218, which are mutually connected by an internal bus 229, in a main body 210.

Also, the operator terminal 200 includes a display device 231, a pointing device 232, a keyboard 233, and a headset 234 as peripheral devices.

The CPU 211 controls the operator terminal 200 in accordance with the program stored in the main storage device 212. The main storage device 212 includes a Random Access Memory (RAM), a Read-Only Memory (ROM), or the like, and stores programs executed by the CPU 211, data for processes conducted by the CPU 211, data acquired in the processes conducted by the CPU 211, and the like. A part of an area of the main storage device 212 is allocated as a working area which is used in the process conducted by the CPU 211.

The display device 231 is connected to the image processing device 213, and instructs the image processing device 213 to display various information items under a control of the CPU 211. The pointing device 232 such as a mouse and the keyboard 233 are connected to the I/O processing device 214. The I/O processing device 214 controls respective inputs of the information items for a process pertinent to the communication between the operator and the customer.

The headset 234 is connected to the audio processing device 215. The audio processing device 215 conducts an audio process for the operator to communicate with the customer. The headset 234 includes a microphone 235 for conversation with the customer, and a speaker 236 for outputting a customer voice. The network card 216 is connected to the network 6 and controls a network communication with the server 100.

The program realizing the process which is conducted by the operator terminal 200 may be provided to the operator terminal 200 by a recording medium 219 such as a Compact Disc Read-Only Memory (CD-ROM) or the like. The recording medium 219 may be formed by a non-transitory (or tangible) computer-readable recording medium. When the recording medium 219 storing the program is set into the driver 218, the driver 218 reads out the program from the recording medium 219, and the program being read out is installed into the auxiliary storage device 217 through the internal bus 229. When the CPU 11 is instructed to execute the program, the CPU 211 starts the process in accordance with the program installed into the auxiliary storage device 217. A recording medium is not limited to the CD-ROM to store the program. The recording medium 219 may be any computer-readable recording medium. As the computer-readable recording medium, a portable recording medium such as a Digital Versatile Disk (DVD) disk, a Universal Serial Bus (USB) memory, or the like, or a semiconductor memory such as a flash memory or the like, as well as the CD-ROM.

Figure 5:
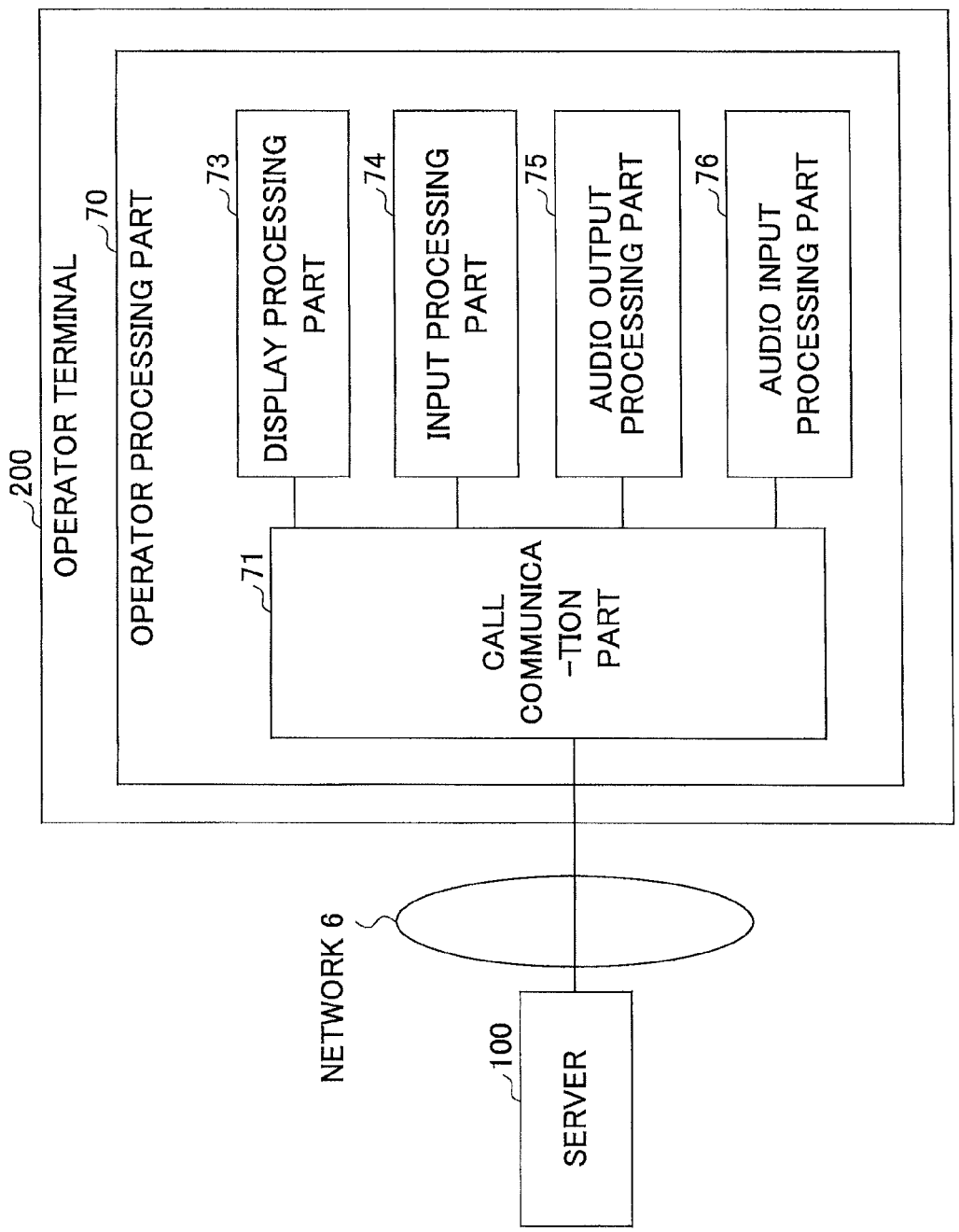
FIG. 5 is a diagram illustrating a functional configuration example of the operator terminal.

FIG. 5 is a diagram illustrating a functional configuration example of the operator terminal 200. The operator terminal 200 illustrated in FIG. 5 includes an operator processing part 70 which is realized by the CPU 211 executing a corresponding program. The operator processing part 70 further includes a call communication part 71, a display processing part 73, an input processing part 74, an audio output processing part 75, and an audio input processing part 76.

The call communication part 71 receives the call from the customer terminal 9 through the server 100 by the connection process conducted by the server 100 to connect to the customer terminal 9, so that the communication becomes available between the operator and the customer. Also, the call communication part 71 controls transmission of packets. In a case of data packets, the call communication part 71 controls the display processing part 73 and the input processing part 74. In a case of audio packets, the call communication part 71 controls the audio output processing part 75 and the audio input processing part 76.

The display processing part 73 controls displaying data at the display device 231 through the image processing device 213. The input processing part 74 processes data input from the pointing device 232 or the keyboard 233 through the I/O processing device 214.

The audio output processing part 75 instructs the audio processing device 215 to process the audio packets of the customer received through the server 100 and to output the voice of the customer from the speaker 236. The audio input processing part 76 creates the audio packets of the voice of the operator input to the microphone 235 and sends the audio packets to the server 100.

Figure 6:
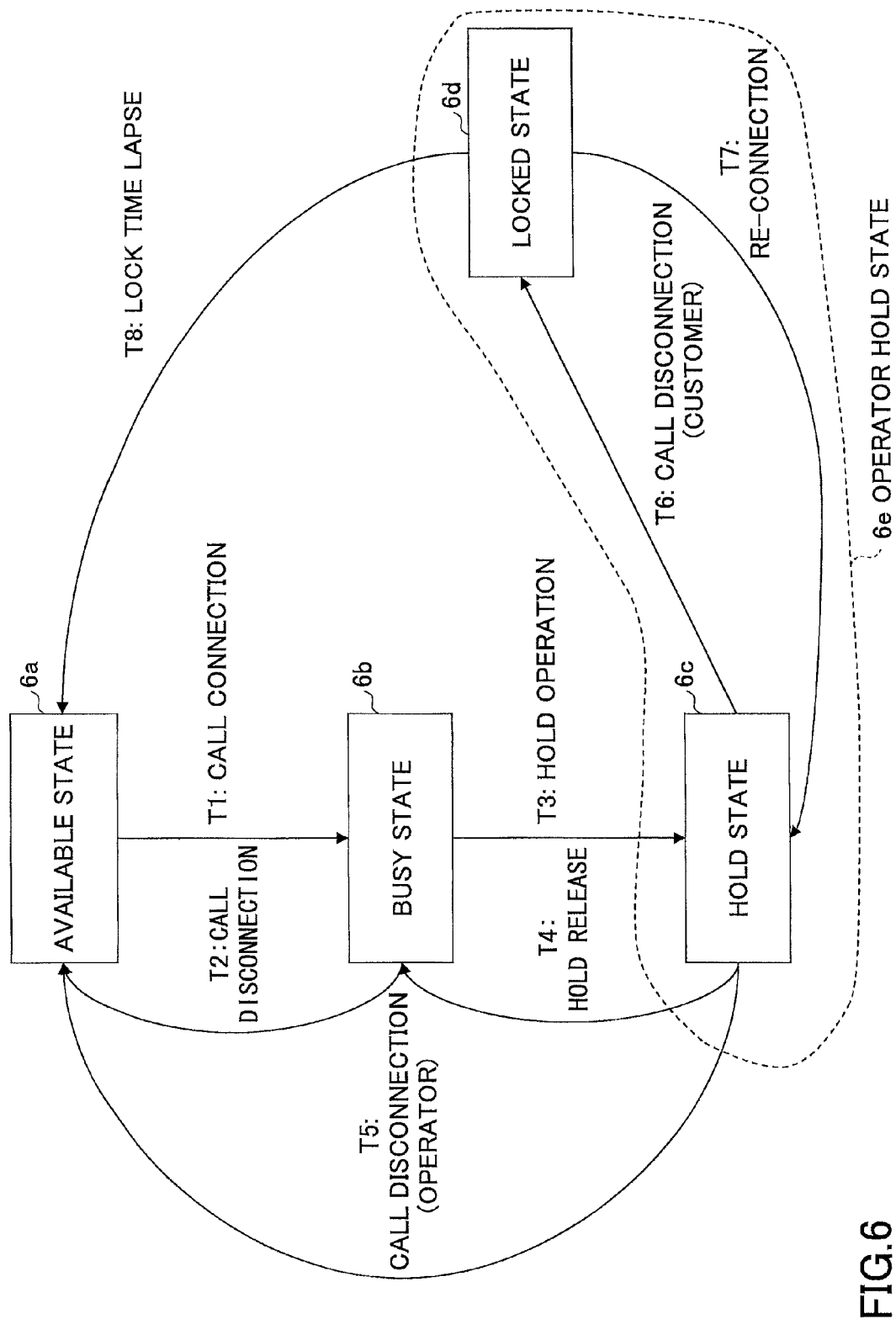
FIG. 6 is a diagram for explaining a state transition of the operator terminal.

FIG. 6 is a diagram for explaining a state transition of the operator terminal 200. In FIG. 6, each of states of the operator terminal 200 managed by the server 100 includes an available state 6a, a busy state 6b, and a locked state 6d. In the states, the hold state 6c and the locked state 6d are not distinctively recognized by the operator. The operator even recognizes the locked state 6d managed by the server 100 at the hold state. Thus, the hold state 6c and the locked state 6d are collectively indicated by an operator hold state 6e.

The operator terminal 200 transitions from the available state 6a to the busy state 6b when the call (the connection request) from the customer terminal 9 is received and a line connection between the operator terminal 200 and the customer terminal 9 is established by a call connection (T1).

In the busy state 6b, a call disconnection (T2) is made, the operator terminal 200 transitions to the available state 6a. On the other hand, in the busy state 6b, by a hold operation (T3) conducted by the operator to the operator terminal 200, the operator terminal 200 transitions to the hold state 6c.

In the hold state 6c, when the operator conducts an operation of a hold release (T4) to the operator terminal 200, the operator terminal 200 transitions to the busy state 6b. Also, in the hold state 6c, when a call disconnection (T5) is made to the operator terminal 200 by the operation of the operator, the operator terminal 200 transitions to the available state 6a. On the other hand, in the hold state 6c, when a call disconnection (T6) is made at the customer terminal 9, the operator terminal 200 transitions to the locked state 6d.

In the locked state 6d, when a re-connection (T7) is conducted for the same customer terminal 9 which made the call disconnection (T6), the operator terminal 200 transitions to the hold state 6c which is the state before the call disconnection (T6). On the other hand, the lock time lapses (T8) in the locked state 6d, the operator terminal 200 transitions to the available state 6a.

Data configuration examples for maintaining the connection state in response to the above described state transition of the operator terminal 200 will be described with reference to FIG. 7A and FIG. 7B.

FIG. 7A is a diagram illustrating a data configuration example of the operator DB 31. In FIG. 7A, the operator DB 31 includes items of an operator ID, a connection state, and the like. The operator ID corresponds to identification information used to identify the operator and substantially specify the operator terminal 200. A value corresponding to the state of the operator terminal 200 depicted in FIG. 6 is set to the connection state. That is, one of values indicating "BUSY", "HOLD", "LOCKED", and "AVAILABLE" is set to the connection state.

"BUSY" indicates a state in which the operator communicates with the customer, that is, in which the operator terminal 200 is in the busy state 6b depicted in FIG. 6.

"HOLD" indicates a state in which the operator holds the call, the is, in which the operator terminal 200 is in the hold state 6c depicted in FIG. 6.

"LOCKED" indicates a state in which any connection from another customer has been excluded for a predetermined time in preparation for the re-connection from the same customer terminal 9 when the communication is disconnected from the customer in the hold state 6c, that is, in which the operator terminal 200 is in the locked state 6d depicted in FIG. 6. The operator recognizes only that the communication of the same customer has been on hold. Since there is no interruption by a new call from another customer, it is possible for the operator to be focused on the work.

"AVAILABLE" indicates a state in which the operator terminal 200 is available to be connected, that is, in which the operator terminal 200 is in the available state 6a depicted in FIG. 6.

In a data example of the operator DB 31 depicted in FIG. 7A, the connection state of an operator ID "OP11111" indicates "LOCKED", the connection state of an operator ID "OP22222" indicates "AVAILABLE", the connection state of an operator ID "OP33333" indicates "BUSY", and the connection state of an operator ID "OP44444" indicates "HOLD".

FIG. 7B is a diagram illustrating a data configuration example of the connection control DB 32. In FIG. 7B, the connection control DB 32 includes items of an operator ID, a customer telephone number, a lock time, and the like. The operator ID indicates the identification information for identifying the operator and is used to substantially specify the operator terminal 200. The customer telephone number indicates a telephone number of the customer terminal 9.

A time to lock is set to the lock time so that the connection with another customer terminal 9 is suppressed based on the lock time standard value 33 when the connection state in the operator DB 31 is changed from "HOLD" to "LOCKED".

In a data example of the connection control DB 32 depicted in FIG. 7B, a record is created to correspond to the customer telephone number "090-1111-2222" for the operator ID "OP44444", when the connection state corresponding to the operator ID "OP44444" is changed to "HOLD" in the operator DB 31. At this point when the record is created, the lock time is blank, that is, the lock time indicates no value.

When the operator of the operator ID "OP44444" releases the hold, the connection state corresponding to the operator ID "OP44444" is changed to "BUSY" in the operator DB 31, and this record is deleted.

The record, which is created when the connection state is changed to "HOLD" and in which the customer telephone number "090-3333-4444" corresponds to the operator ID "OP11111", indicates that the lock time is set, since the call disconnection is made by the customer terminal 9.

The lock time indicates a date, and a lock start time and a lock end time in a format "yyyy/mm/dd hh:mm:ss to hh:mm:ss". A disconnection time is set to the lock start time. A value, which is acquired by adding a value "3 min" of the lock time standard value 33 to the disconnected time, is set to the lock end time.

In this example, by setting "2010/09/30 10:20:55 to 10:23:55", a control is performed not to connect the call from another customer to the operator ID "OP11111" between the lock start time "10:20:55" and the lock end time "10:23:55" on the date "2010/09/30".

The connection state of the operator ID "OP11111" indicates "LOCKED" in the operator DB 31. During "LOCKED", in a case in that which the call is received from the same telephone number "090-3333-4444", the connection state is changed from "LOCKED" to "HOLD". In addition, the blank (no value) is set to the lock time of the operator ID "OP11111" in the connection control DB 32.

On the other hand, when the lock time of the operator ID "OP11111" in the connection control DB 32 lapses, the record of the operator ID "OP11111" is deleted. Also, "AVAILABLE" is set to the connection state of the operator ID "OP11111" in the operator DB 31.

Figure 8:
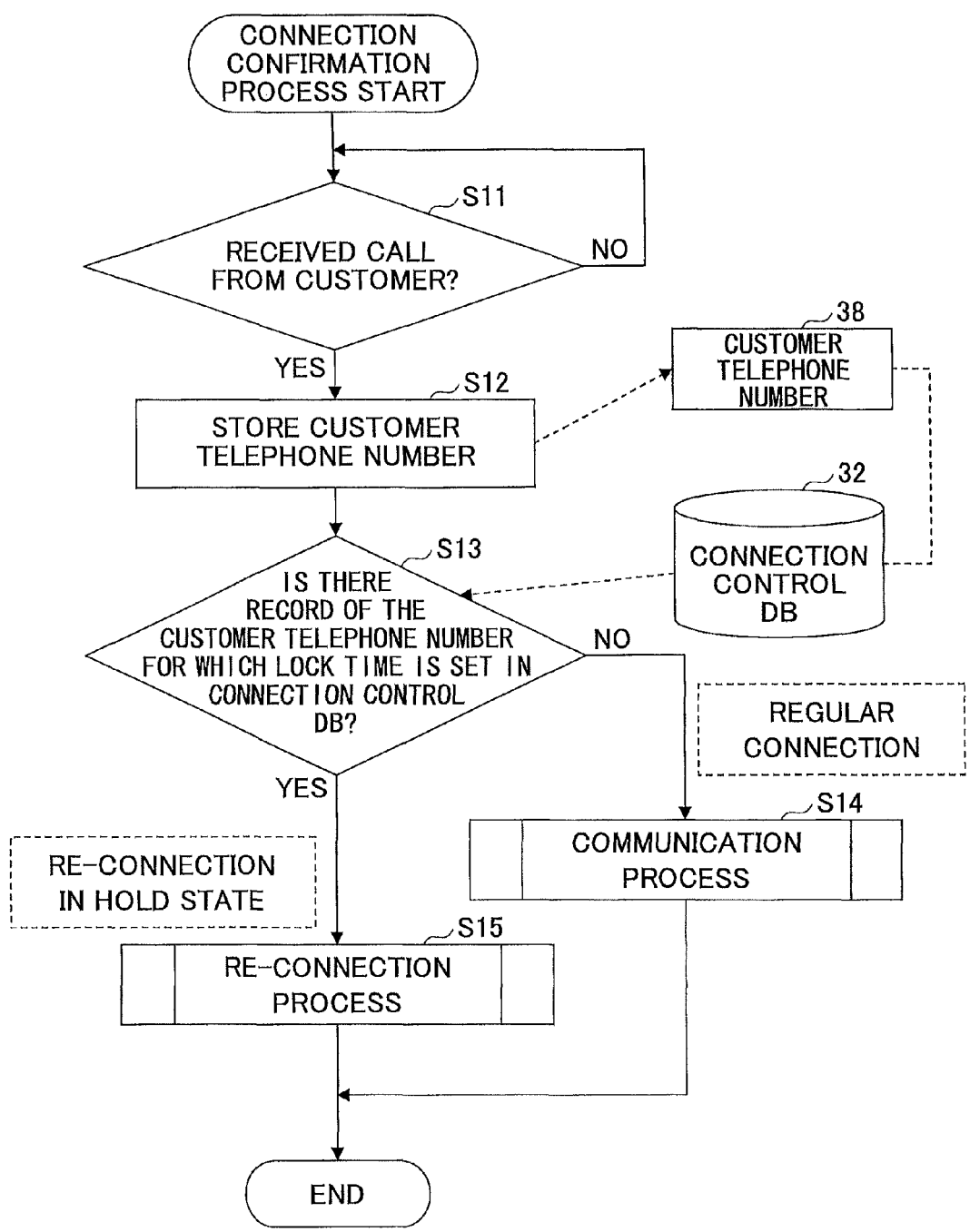
FIG. 8 is a flowchart for explaining a connection confirmation process by a connection confirmation part in the server.

Next, the connection control process of the call received from the customer in the embodiment will be described. First, a connection confirmation process, which is conducted by the connection confirmation part 41 in the connection control processing part in the server 100, will be described. FIG. 8 is a flowchart for explaining the connection confirmation process by the connection confirmation part 41 in the server 100.

In FIG. 8, the connection confirmation part 41 determines at predetermined intervals whether the call is received from the customer (step S11). The connection confirmation part 41 determines whether the connection request (the call) is received from the customer terminal 9. When the connection request is not received, the connection confirmation part 41 waits for the connection request, and repeats step S11.

On the other hand, in step S11, when the connection request is received, the connection confirmation part 41 acquires a customer telephone number 38 from the connection request, and stores the customer telephone number 38 in a working area of the storage part 30 (step S12).

After that, the connection confirmation part 41 refers to the connection control DB 32, and determines whether there is a record of the customer telephone number 38 for which the lock time is set (step S13). When there is no record of the customer telephone number 38, the connection confirmation part 41 instructs the communication processing part 50 to perform the communication process by the regular connection (step S14). When the communication process ends, the connection confirmation process ends.

On the other hand, when there is a record of the customer telephone number 38 in step S13, the connection confirmation part 41 determines that the connection request is made by the re-connection of the same customer telephone number 38 based on the operator hold state 6e, and instructs the re-connection processing part 60 to perform the re-connection process (step S15). When the re-connection process ends, the connection confirmation process ends.

Figure 9:
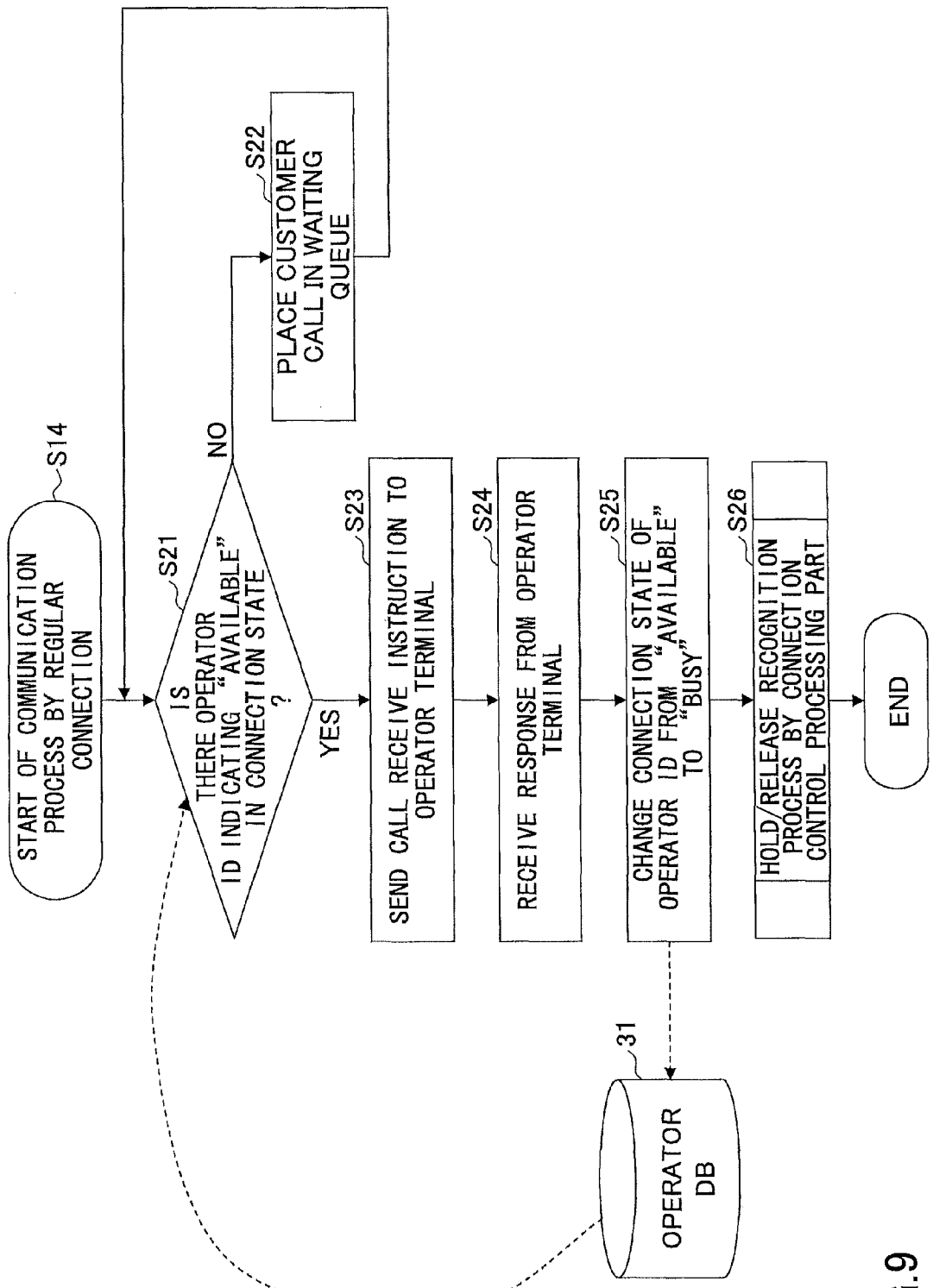
FIG. 9 is a flowchart for explaining a communication process by a regular connection in step S14 in FIG. 8.

The communication process by the regular connection, which is conducted by the communication processing part 50 in step S14 in FIG. 8, will be described with reference to FIG. 9. FIG. 9 is a flowchart for explaining the communication process by the regular connection in step S14 in FIG. 8. In FIG. 9, when the communication processing part 50 receives an instruction of the communication process from the connection confirmation part 41 of the connection control processing part 40 in response to the connection request sent from the customer terminal 9, the operator determination part 51 of the communication processing part 50 determines by referring to the operator DB 31 whether there is the operator ID for which the connection state indicates "AVAILABLE" (step S21). When there is an operator ID, the operator determination part 51 adds the call of the customer to a waiting queue (step S22), and goes back to step S21 to repeat the above described processes until the operator ID in which the connection state indicates "AVAILABLE" is acquired.

On the other hand, in step S21, when there is the operator ID, the operator determination part 51 reports the operator ID acquired from the operator DB 31 to the call connection part 52. The call connection part 52 sends a call receive instruction to the operator terminal 200 corresponding to the operator ID reported from the operator determination part 51 (step S23).

When the call connection part 52 receives a response from the operator terminal 200 in response to the call receive instruction (step S24), the call connection part 52 changes the connection state of the operator ID in the operator DB 31 from "AVAILABLE" to "BUSY" (step S25).

The communication processing part 50 instructs the hold/release recognition part 42 of the connection control processing part 40 to perform a process corresponding to a change of the connection state (step S26), and terminates the connection confirmation process.

Figure 10:
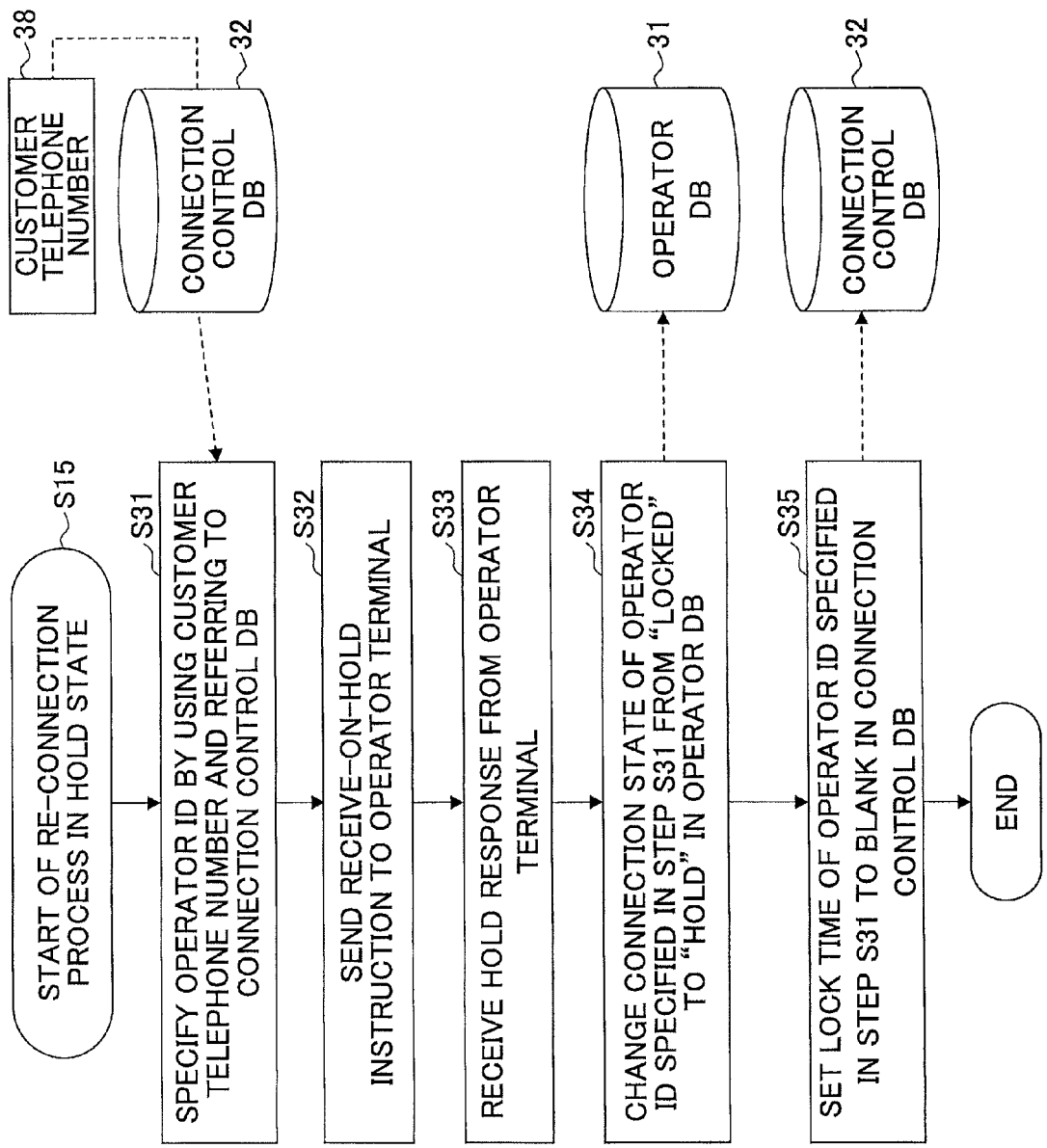
FIG. 10 is a flowchart for explaining a re-connection process in a hold state in step S15 in FIG. 8.

The re-connection process in the operator hold state 6e, which is conducted by the communication processing part 50 in step S15 in FIG. 8, will be described with reference to FIG. 10. FIG. 10 is a flowchart for explaining the re-connection process in step S15 in FIG. 8 while the call has been held. In FIG. 10, when an instruction of the re-connection process with respect to the connection request sent from the customer terminal 9 is received from the connection confirmation part 41 of the connection control processing part 40 in the locked state 6d, the re-connection part 61 of the re-connection processing part 60 refers to the connection control DB 32 by using the customer telephone number 38 stored in the storage part 30, and specifies the operator ID (step S31).

The re-connection part 61 sends a receive-on-hold instruction for receiving the call while being on hold, to the operator terminal 200 corresponding to the operator ID (step S32), and receives a hold response from the operator terminal 200 (step S33).

When the hold response is received from the operator terminal 200, the re-connection part 61 changes the connection state of the operator ID specified in step S31 from "LOCKED" to "HOLD" in the operator DB 31 (step S34).

Also, the re-connection part 61 sets the lock time of the operator ID specified in step S31 to blank in the connection control DB 32 (step S35). After that, the re-connection part 61 terminates the re-connection process.

Figure 11:
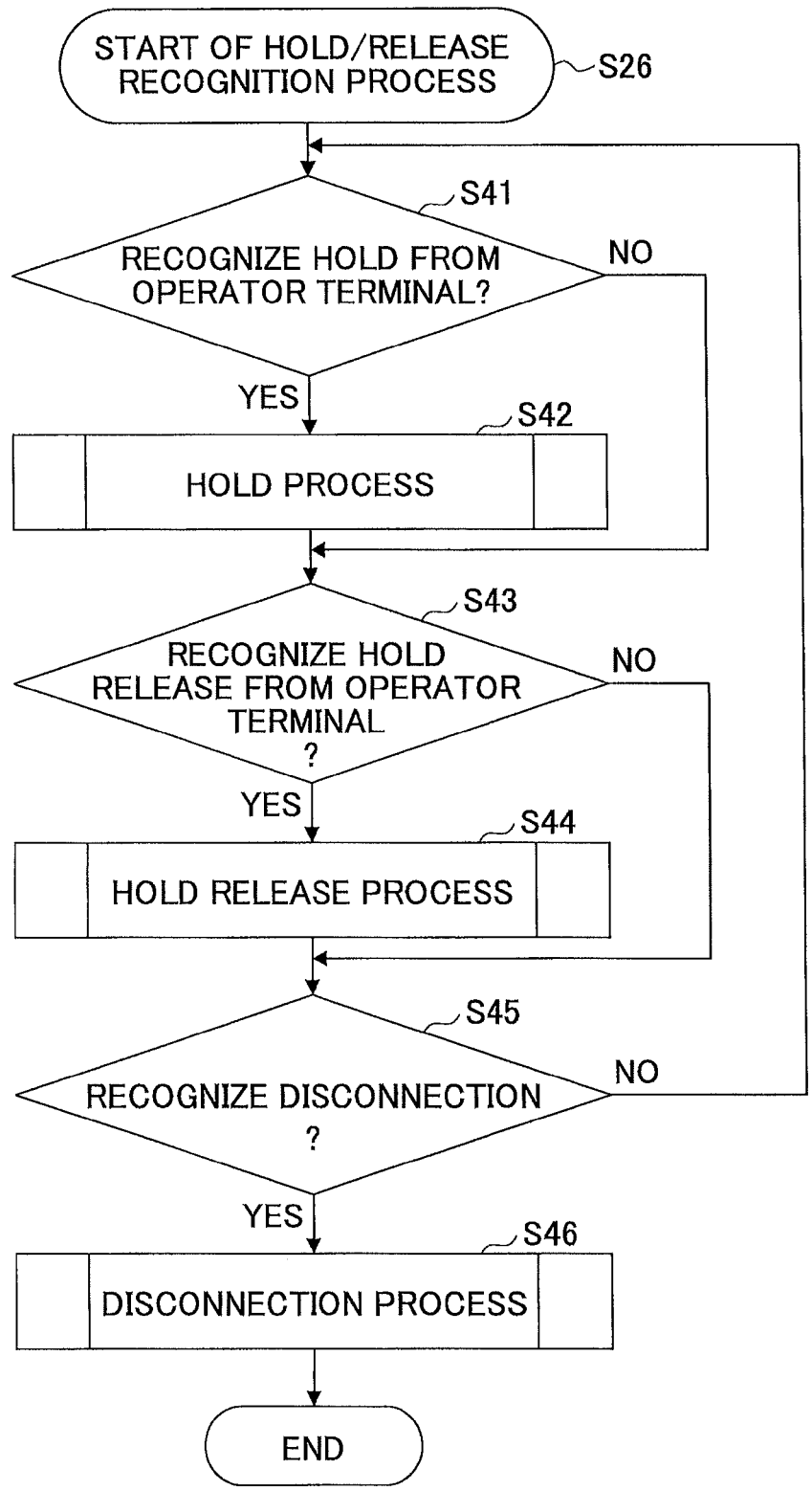
FIG. 11 is a flowchart for explaining a hold/release recognition process conducted by a hold/release recognition part of a connection control processing part.

Next, the hold/release recognition process, which is conducted by the hold/release recognition part 42 of the connection control processing part 40 in step S26 in FIG. 9, will be described with reference to FIG. 11. FIG. 11 is a flowchart for explaining the hold/release recognition process conducted by the hold/release recognition part 42 of the connection control processing part 40. In FIG. 11, the hold/release recognition part 42 of the connection control processing part 40 conducts either one of the hold process, the hold release process, and the disconnection process.

The hold/release recognition part 42 determines whether the hold from the operator terminal 200 is recognized by an event report (step S41). When the operator selects a hold button displayed at a display device 231 of the operator terminal 200 by the pointing device 232, the event report indicating the hold is sent to the hold/release recognition part 42. When the event report is a report of the hold, the part hold/release recognition part 42 performs the hold process (step S42).

On the other hand, in step S41, when the event report is not the report of the hold, the hold/release recognition part 42 determines whether the hold release from the operator terminal 200 is recognized by the event report (step S43). When the operator selects a hold release button displayed at the display device 231 of the operator terminal 200 by the pointing device 232, the event report indicating the hold is sent to the hold/release recognition part 42. When the event report is a report of the hold release, the hold/release recognition part 42 performs the hold release process (step S44).

On the other hand, in step S43, when the event report is not the report of the hold release, the hold/release recognition part 42 determines whether the call disconnection is recognized by the event report (step S45).

The call disconnection may be conducted by the operator or may be recognized by detecting a signal of the call detection from the customer terminal 9. In a case in which the call disconnection is conducted by the operator, when the operator selects a call disconnection button displayed at the display device 231 of the operator terminal 200 by the pointing device 232, the event report indicating the call disconnection is sent to the server 100. In a case in which the signal of the call disconnection from the customer terminal 9 is detected, the event report is sent from the communication processing part 50 to the communication processing part 50.

In step S45, if the call disconnection is not recognized, the hold/release recognition part 42 goes back to step S41 to monitor the event report, and conducts the above described processes. If the call disconnection is recognized by the event report, the hold/release recognition part 42 performs the disconnection process (step S46), and terminates the hold/release recognition process.

The hold/release recognition part 42 of the connection control processing part 40 conducts the above described steps S41 to S46 for each of event reports. The hold/release recognition part 42 may conduct processes of steps S41 to S46 in a report order by using a queue for the event reports.

Figure 12:
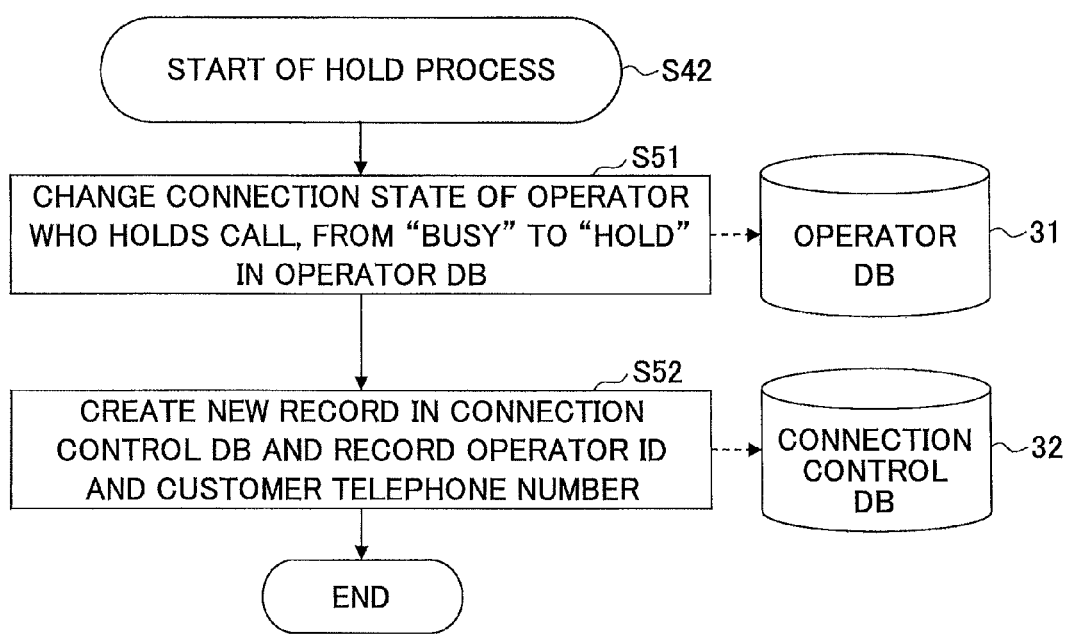
FIG. 12 is a flowchart for explaining a hold process in step S42 in FIG. 11.

FIG. 12 is a flowchart for explaining the hold process in step S42 in FIG. 11. In FIG. 12, the hold/release recognition part 42 changes the connection state of the operator who holds the call from "BUSY" to "HOLD" by using the operator ID indicated by the event report in the operator DB 31 (step S51).

Next, the hold/release recognition part 42 creates a new record in the connection control DB 32, and records the operator ID and the customer telephone number (step S52). In the data example of the connection control DB 32 depicted in FIG. 7B, the record of the operator ID "OP44444" is newly created. After that, the hold/release recognition part 42 terminates the hold process.

Figure 13:
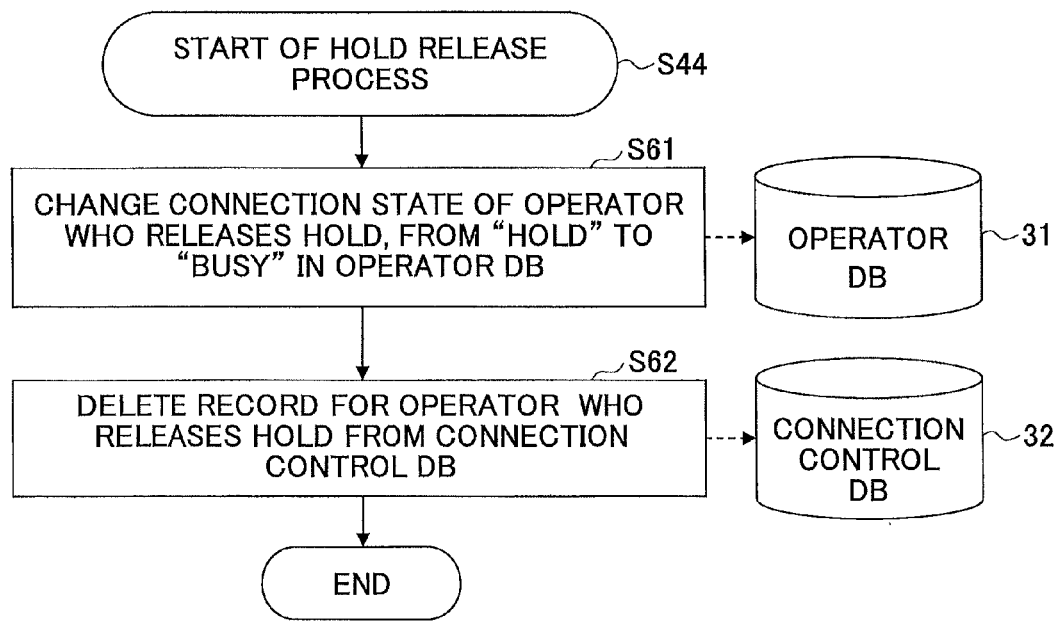
FIG. 13 is a flowchart for explaining a hold release process in step S44 in FIG. 11.

FIG. 13 is a flowchart for explaining the hold release process in step S44 in FIG. 11. In FIG. 13, the hold/release recognition part 42 changes the connection state of the operator who releases the hold in the operator DB 31, by using the operator ID indicated by the event report (step S61).

Moreover, the hold/release recognition part 42 deletes the record of the operator who releases the hold, from the connection control DB 32 (step S62). In the data example of the connection control DB 32 depicted in FIG. 7B, if the operator of the operator ID "OP44444" releases the hold, the record of the operator ID "OP44444" is deleted. The hold/release recognition part 42 terminates the hold release recognition.

Figure 14:
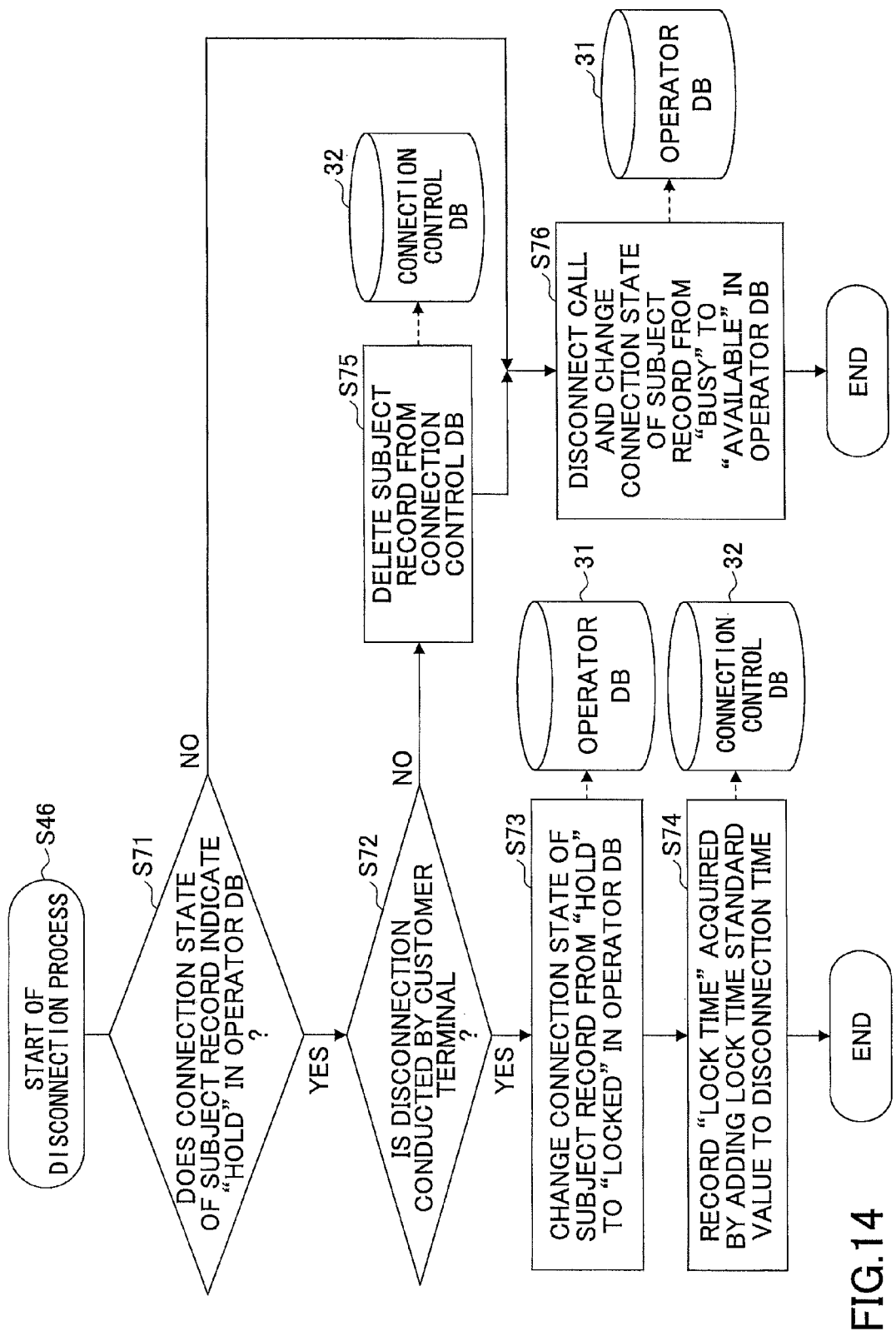
FIG. 14 is a flowchart for explaining a disconnection process in step S46 in FIG. 11.

FIG. 14 is a flowchart for explaining the disconnection process in step S46 in FIG. 11. In FIG. 14, the hold/release recognition part 42 determines whether the connection state of a subject record in the operator DB 31 indicates "HOLD", by using the operator ID indicated by the event report indicating the call disconnection (step S71). The operator ID and the customer terminal number are included in the event report indicating the call disconnect. The hold/release recognition part 42 refers to the record of the operator ID indicated by the event report from the operator DB 31, and determines whether "HOLD" is set to the connection state. When the connection state of the subject record does not indicate "HOLD", the hold/release recognition part 42 advances to step S76.

On the other hand, when it is determined that the connection state of the subject record indicates "HOLD" in step S71, the hold/release recognition part 42 refers to the event report, and determines whether the call disconnection is conducted by the customer terminal 9 (step S72). The hold/release recognition part 42 may refer to the event report, and determine whether the customer terminal number is indicated in a disconnection originator of the event report. When the call disconnection is not conducted by the customer terminal 9, that is, when the call disconnection is conducted by the operator terminal 200, the hold/release recognition part 42 advances to step S75

On the other hand, when it is determined that the call disconnection is conducted by the customer terminal 9 in step S72, the hold/release recognition part 42 changes the connection state of the subject record from "HOLD" to "LOCKED" in the operator DB 31 (step S73). Also, the hold/release recognition part 42 refers to the connection control DB 32, and records a value acquired by adding the lock time standard value 33 to the disconnection time, to the lock time corresponding to the operator ID (step S74). Then, the hold/release recognition part 42 terminates the disconnection process.

On the other hand, when it is determined in step S72 that the call disconnection is not conducted by the customer terminal 9, that is, when the call disconnection is not conducted by the operator terminal 200, the hold/release recognition part 42 deletes the subject record from the connection control DB 32 (step S75).

After that, the hold/release recognition part 42 disconnects the communication, and changes the connection state of the subject record from "BUSY" to "AVAILABLE" in the operator DB 31 (step S76). The disconnection process is terminated.

Figure 15:
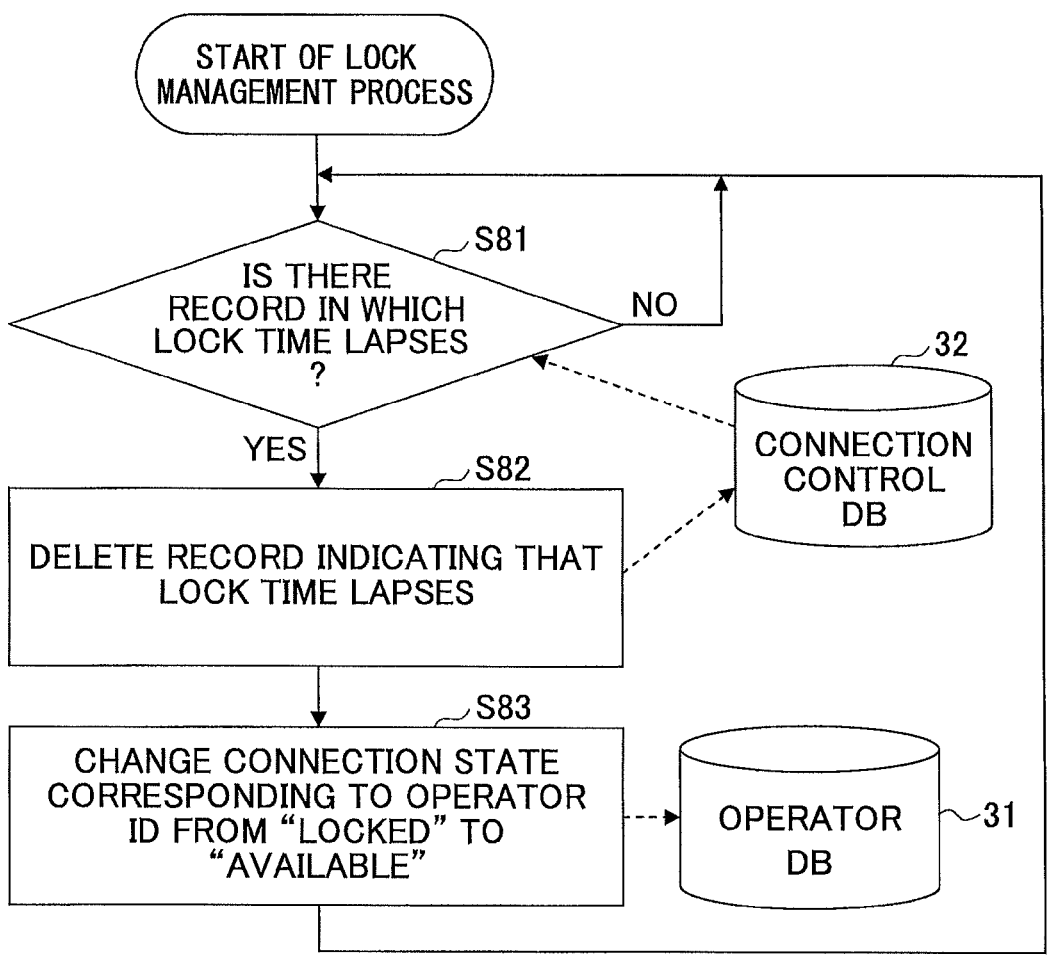
FIG. 15 is a flowchart for explaining a lock management process conducted by a lock management part of a connection control processing part.

Next, a lock management process, which is conducted by the lock management part 44 of the connection control processing part 40, will be described with reference to FIG. 15. FIG. 15 is a flowchart for explaining the lock management process conducted by the lock management part 44 of the connection control processing part 40. In FIG. 15, the lock management part 44 repeats processes from step S81 to step S83.

The lock management part 44 determines whether there is a record in the connection control DB 32 in which the lock time lapses (step S81). When there is no record in which the lock time lapses, the lock management part 44 goes back to step S81.

When there is a record in which the lock time lapses, the lock management part 44 deletes the record of interest from the connection control DB 32 after the operator ID is acquired from the record (step S82). Moreover, the lock management part 44 changes the connection state corresponded to the operator ID acquired in step S82, from "LOCKED" to "AVAILABLE" in the operator DB 31 (step S83). The lock management part 44 goes back to step S82 and repeats the above described processes.

Figure 16:
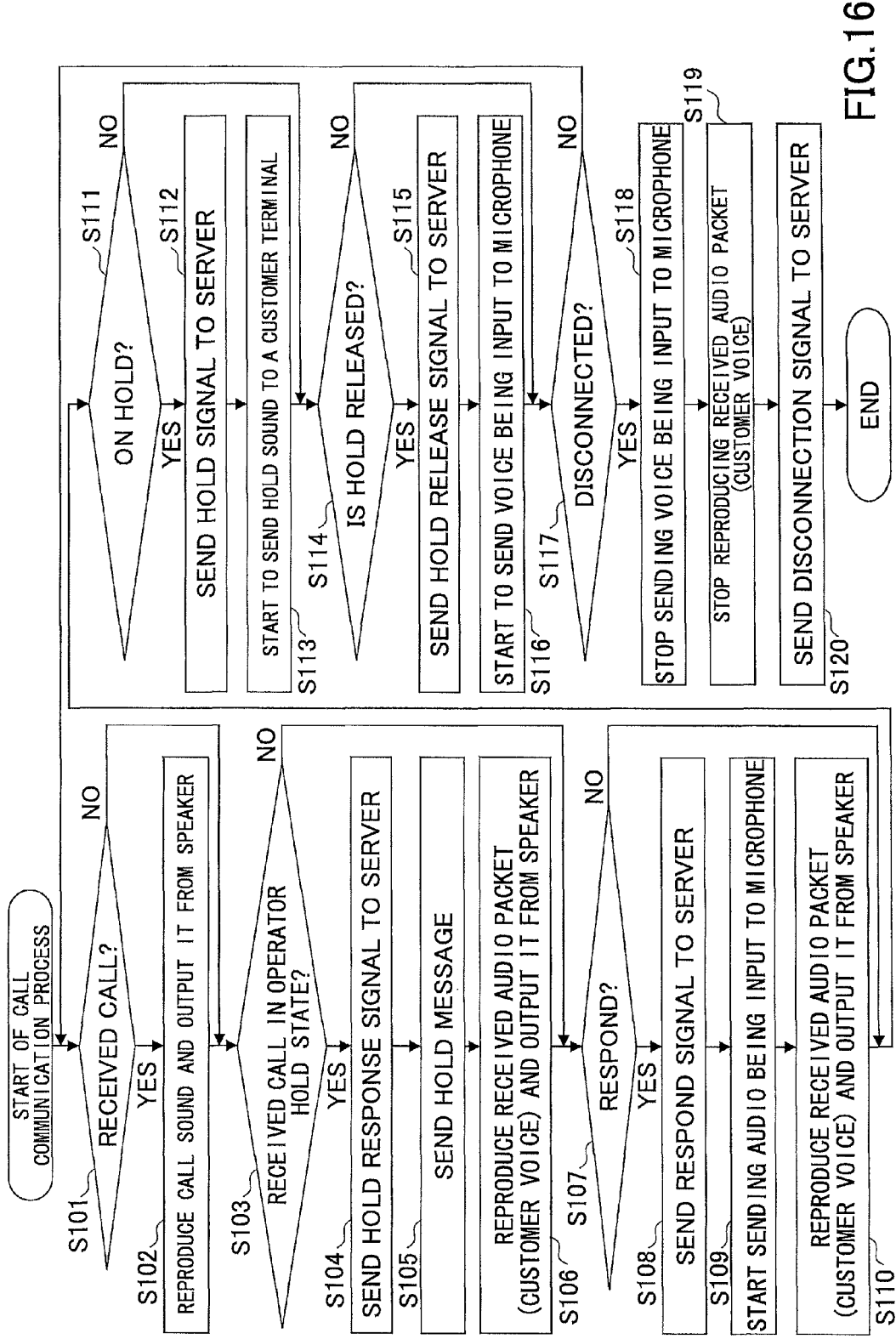
FIG. 16 is a diagram for explaining a call communication process by the call communication part of an operator terminal.

Next, a call communication process at the operator terminal 200 will be described with reference to FIG. 16. FIG. 16 is diagram for explaining the call communication process by the call communication part 71 of the operator terminal 200. In FIG. 16, the call communication part 71 repeats steps S101 to S120 every detection of receiving the packets from the server 100 or of an event caused by the operation of the operator.

In the operator terminal 200, the call communication part 71 determines whether a detection event is received (step S101). When the detection event is not received, the call communication part 71 advances to step S103. When the detection event is received, the call communication part 71 reports the audio output processing part 75 that the detection event is received, so as to reproduce a call sound and output the sound from the speaker 236 (step S102).

The call communication part 71 determines whether the detection event is received in the operator hold state 6e (step S103). It is determined whether a receive-on-hold is conducted for the detection event. It is noted that the receive-on-hold corresponds to receiving the re-connection request from the customer terminal 9 while retaining the operator hold state 6e (FIG. 6). When the detection event is not received in the operator hold state 6e, that is, when the receive-on-hold is not conducted for the detection event, the call communication part 71 advances to step S107.

When the detection event is received in the operator hold state 6e, that is, when the receive-on-hold is conducted for the detection event, the call communication part 71 sends a hold response signal to the server 100, instead of reproducing the call sound (step S104). Moreover, the call communication part 71 sends a hold message of audio data, which is recorded beforehand in the auxiliary storage device 217, to the customer terminal 9 through the server 100 (step S105). Furthermore, the call communication part 71 reproduces the customer voice from the audio packets, which are received from the customer terminal 9, by the audio output processing part 75, and outputs the customer voice from the speaker 236 (step S106).

In the embodiment, the call communication part 71 suppresses outputting the hold message, which is sent to the customer terminal 9, from the speaker 236. Instead, the call communication part 71 controls to output the audio packets received from the customer terminal from the speaker 236. By this control, it is possible for the operator to determine an appearance of the customer based on the customer voice output from the speaker 236 while successively working in the hold state.

Figure 17:
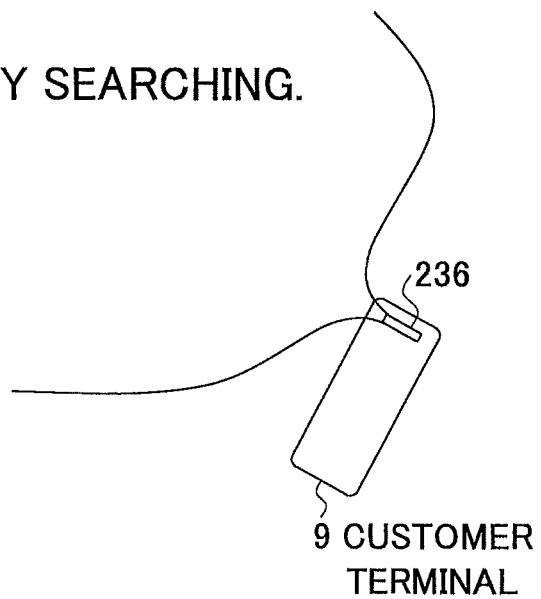
FIG. 17 is a diagram illustrating a hold message example.

The hold message sent to the customer terminal 9 in step S105 may be output from a speaker of the customer terminal 9 as a message "WE ARE CURRENTLY SEARCHING. PLEASE WAIT." as depicted in FIG. 17.

The call communication part 71 determines whether the detection event indicates that the operator responds (step S107). When the detection event does not indicate that the operator responds, the call communication part 71 advances to step S111.

On the other hand, when the detection event does indicate that the operator responds in step S107, the call communication part 71 sends a response signal to the server 100 (step S108). Also, the call communication part 71 processes operator voice input to the microphone 235 into the audio packets by the audio input processing part 76, and starts sending the audio packets to the customer terminal 9 through the server 100 (step S109). Moreover, the call communication part 71 instructs the audio output processing part 75 to reproduce the audio packets (the customer voice) received from the customer terminal 9 and to output the customer voice from the speaker 236 (step S110).

The call communication part 71 determines whether the detection event indicates that the operator holds the communication (step S111). When the detection event does not indicate that the operator holds the communication, the call communication part 71 advances to step S114. On the other hand, when the detection event indicates that the operator holds the communication, the call communication part 71 sends the hold signal to the server 100 (step S112), and starts to send the hold sound to the customer terminal 9 through the server 100 (step S113).

The call communication part 71 determines whether the detection event indicates hold release (step S114). When the detection event does not indicate the hold release, the call communication part 71 advances to step S117. On the other hand, when the detection event indicates the hold release, the call communication part 71 sends a hold release signal to the server 100 (step S115). Also, the call communication part 71 processes the operator voice input to the microphone 235 into the audio packets by the audio input processing part 76, and starts to send the audio packets to the customer terminal 9 through the server 100 (step S116).

The call communication part 71 determines whether the detection event indicates that the operator disconnects (step S117). When the detection event does not indicate that the operator disconnected, the call communication part 71 goes back to step S101, and repeats the above described processes. On the other hand, when the detection event indicates that the operator disconnected, the call communication part 71 stops sending the operator voice input into the microphone 235 (step S118). Also, the call communication part 71 stops reproducing the audio packets (the customer voice) received from the customer terminal 9 (step S119), and sends a disconnection signal to the server 100 (step S120). After that, the call communication part 71 terminates the call communication process.

As described above, according to the embodiment, in a case in which a disconnection occurs on hold in which is conducted by the operator and the re-connection request is received from the same customer terminal 9, it is possible to connect the line for the same customer terminal 9 while retaining the hold state in which a responding and receiving operation by the operator is not demanded.

Even in a case in which the re-connection request is received from the customer terminal 9 due to a line disconnection after the operator of the call center holds the communication with the customer of the customer terminal 9, it is possible for the operator to concentrate on a work without the responding and receiving operation. As a result, it is possible for the operator to conduct substantial response work faster.

As described above, it is possible to conduct the line connection with retaining the hold state in which the responding and receiving operation at a call receiving side when the communication is disconnected in the hold state and the re-connection request is conducted.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A line connection apparatus, comprising:
   a processor; and
   a storage part;
   wherein the processor includes:
      a hold/release recognition part configured to record first person identification information by corresponding to second person identification information in a connection database stored in the storage part when a hold is recognized, the first person identification information identifying a first person who holds a line, the second person identification information identifying a second person for whom the line is held, the connection database for managing holding a line and releasing a hold of the line; and
      a connection control part configured to refer to the connection control database stored in the storage part and to have a first person terminal of the first person receive a re-connection request while retaining a hold state based on the first person identification information, which is corresponded to the second person identification information indicated by the re-connection request, in response to the re-connection request conducted by a same second person after the line is disconnected in the hold state,
   wherein the hold/release recognition part includes
      a disconnection part configured to set a value acquired by adding a lock time standard value to a disconnection time to a lock time in the connection control database when recognizing a disconnection of the line, the lock time being corresponded to the first person identification information and the second person identification information which are pertinent to the disconnection of the line, the lock time standard value to exclude a connection request sent from a terminal other than a second person terminal of the second person identification information; and
   the connection control part includes
      a second person identification information acquisition part configured to acquire the second person identification information from the re-connection request; and
      a determination part configured to determine whether the lock time is set by corresponding to the second person identification information acquired by the second person identification information acquisition part in the connection control database,
   wherein when it is determined that the lock time is set by the determination part, the connection control part makes the first person terminal of the first person to receive the re-connection request based on the first person identification information corresponded to the second person identification information.

2. The line connection apparatus as claimed in claim 1, further comprising:
   a re-connection part configured to make the first person terminal of the first person to receive the re-connection request in the hold state, and to set the lock time to blank in the connection control database, the lock time corresponded to the second person identification information acquired from the re-connection request, in response to a re-connection instruction of the connection control part.

3. The line connection apparatus as claimed in claim 1, wherein
   the line connection apparatus is placed at a call center;
   the first person identification information indicates identification information to identify an operator;
   the second person identification information indicates a telephone number of the first person terminal;
   the storage part further stores an operator database to maintain a connection state of a line for the identification information of the operator; and
   the hold/release recognition part sets a hold state to the connection state when a hold is recognized, sets a locked state to the connection state when the disconnection of the line is recognized in the hold state, and sets a busy state to the connection state when a hold release is recognized.

4. The line connection apparatus as claimed in claim 3, further comprising a lock management part configured to delete a record in which the lock time lapses, from the connection control database.

5. The line connection apparatus as claimed in claim 4, wherein the lock management part sets the connection state to blank in the operator database, the connection state corresponding to the identification information of the operator indicated in the record in which the lock time lapses in the connection control database.

6. The line connection apparatus as claimed in claim 1, wherein the hold/release recognition part deletes the record of the first person identification information of the first person who releases the hold when the hold release is recognized.

7. A line connection method performed in a computer, the method comprising:
 recording, by the computer, first person identification information by corresponding to second person identification information in a connection control database stored in a storage part when a hold is recognized, the first person identification information identifying a first person who holds a line, the second person identification information identifying a second person for whom the line is held, the connection control database for managing holding a line and releasing a hold of the line; and
 referring, by the computer, to the connection control database stored in the storage part and to have a first person terminal of the first person receive a re-connection request while retaining a hold state based on the first person identification information, which is corresponded to the second person identification information indicated by the re-connection request, in response to the re-connection request conducted by a same second person after the line is disconnected in the hold state,
 wherein the recording the first person identification information includes
  setting, by the computer, a value acquired by adding a lock time standard value to a disconnection time to a lock time in the connection control database when recognizing a disconnection of the line, the lock time being corresponded, to the first person identification information and the second person identification information which are pertinent to the disconnection of the line, the lock time standard value to exclude a connection request sent from a terminal other than a second person terminal of the second person identification information; and
 the referring to the connection control database includes
  acquiring, by the computer, the second person identification information from the re-connection request; and
  determining, by the computer, whether the lock time is set by corresponding to the second person identification information acquired by the acquiring the second person identification information in the connection control database,
  wherein when the determining determines that the lock time is set, the referring to the connection control database makes the first person terminal of the first person to receive the re-connection request based on the first person identification information corresponded to the second person identification information.

8. The line connection method as claimed in claim 7, the method further comprising locking, by the computer, the first person terminal not to receive another connection request from a terminal other than the second person terminal when the line is disconnected by the second person in the hold state.

9. A non-transitory computer-readable recording medium recorded with a program which, when executed by a computer, causes the computer to perform a line control process comprising:
 recording first person identification information by corresponding to second person identification information in a connection control database stored in a storage part when a hold is recognized, the first person identification information identifying a first person who holds a line, the second person identification information identifying a second person for whom the line is held, the connection control database for managing holding a line and releasing a hold of the line; and
 referring to the connection control database stored in the storage part and to have a first person terminal of the first person receive a re-connection request while retaining a hold state based on the first person identification information, which is corresponded to the second person identification information indicated by the re-connection request, in response to the re-connection request conducted by a same second person after the line is disconnected in the hold state,
 wherein the recording the first person identification information includes
  setting a value acquired by adding a lock time standard value to a disconnection time to a lock time in the connection control database when recognizing a disconnection of the line, the lock time being corresponded to the first person identification information and the second person identification information which are pertinent to the disconnection of the line, the lock time standard value to exclude a connection request sent from a terminal other than a second person terminal of the second person identification information; and
 the referring to the connection control database includes
  acquiring the second person identification information from the re-connection request; and
  determining whether the lock time is set by corresponding to the second person identification information acquired by the acquiring the second person identification information in the connection control database,
  wherein when the determining determines that the lock time is set, the referring to the connection control database makes the first person terminal of the first person to receive the re-connection request based on the first person identification information corresponded to the second person identification information.

10. The line connection apparatus as claimed in claim 1, wherein the hold/release recognition part locks the first person terminal not to receive another connection request from a terminal other than the second person terminal when the line is disconnected by the second person in the hold state.

11. The non-transitory computer-readable recording medium as claimed in claim 9, the line control process further comprising locking, by the computer, the first person terminal not to receive another connection request from a terminal other than the second person terminal when the line is disconnected by the second person in the hold state.

* * * * *